(12) United States Patent
Ohkawa et al.

(10) Patent No.: US 9,897,905 B2
(45) Date of Patent: Feb. 20, 2018

(54) HEAD-UP DISPLAY FOR DISPLAYING AN IMAGE ON A COMBINER CAPABLE OF BEING SELF-RETURNED TO AN ORIGINAL POSITION

(71) Applicant: NIDEC SANKYO CMI CORPORATION, Shizuoka (JP)

(72) Inventors: Takanori Ohkawa, Shizuoka (JP); Osamu Kodaira, Shizuoka (JP); Hiroyuki Hatasako, Shizuoka (JP); Takafumi Kasuga, Shizuoka (JP); Takahisa Ueki, Shizuoka (JP)

(73) Assignee: NIDEC SANKYO CMI CORPORATION, Shizuoka (JP)

( * ) Notice: Subject to any disclaimer, the term of this patent is extended or adjusted under 35 U.S.C. 154(b) by 0 days.

(21) Appl. No.: 15/372,406

(22) Filed: Dec. 8, 2016

(65) Prior Publication Data
US 2017/0168300 A1 Jun. 15, 2017

(30) Foreign Application Priority Data
Dec. 10, 2015 (JP) .................................. 2015-240784

(51) Int. Cl.
*G03B 21/30* (2006.01)
*B60K 35/00* (2006.01)
*G02B 27/01* (2006.01)

(52) U.S. Cl.
CPC .............. *G03B 21/30* (2013.01); *B60K 35/00* (2013.01); *G02B 27/0149* (2013.01);
(Continued)

(58) Field of Classification Search
CPC ............ B60K 35/00; B60K 2350/2052; B60K 2350/405; G02B 27/0149; G02B 2027/0154; G02B 2027/0163; G03B 21/30
See application file for complete search history.

(56) References Cited

U.S. PATENT DOCUMENTS

| 8,937,765 B2 * | 1/2015 | Hopf .................. B60R 11/0235 359/443 |
| 2014/0340851 A1 * | 11/2014 | Yomogita ............ H05K 5/0017 361/725 |

FOREIGN PATENT DOCUMENTS

| CN | 204258187 | 4/2015 |
| DE | 102014107076 | 11/2014 |

(Continued)

OTHER PUBLICATIONS

"Search Report of Europe Counterpart Application", dated May 26, 2017, p. 1-p. 6.

*Primary Examiner* — Sultan Chowdhury
*Assistant Examiner* — Magda Cruz
(74) *Attorney, Agent, or Firm* — JCIPRNET (57) ABSTRACT

A head-up display includes a case main body formed with an opening part, a combiner capable of closing the opening part, a combiner drive unit including a drive device and a spring, and a projection unit. The combiner, the combiner drive unit and the projection unit are accommodated inside the case main body. The combiner drive unit is integrally provided with a second turnable shaft and a bearing turnably supporting the second turnable shaft is provided in a base part fixed to the case main body so as to be turnable with respect to the base part. A first spring for urging the bearing with respect to the base part in one direction is provided between the base part and the bearing. A second spring for urging the combiner drive unit with respect to the bearing in an opposite direction is provided between the bearing and the combiner drive unit.

2 Claims, 6 Drawing Sheets

(52) U.S. Cl.
CPC  *B60K 2350/2052* (2013.01); *B60K 2350/405* (2013.01); *G02B 2027/0154* (2013.01); *G02B 2027/0163* (2013.01)

(56) References Cited

FOREIGN PATENT DOCUMENTS

| | | | | |
|---|---|---|---|---|
| JP | 10010464 A | * | 1/1998 | ......... G02B 27/0103 |
| JP | H11-091403 | | 4/1999 | |
| WO | 2009027410 | | 3/2009 | |

* cited by examiner

HEAD-UP DISPLAY FOR DISPLAYING AN IMAGE ON A COMBINER CAPABLE OF BEING SELF-RETURNED TO AN ORIGINAL POSITION

TECHNICAL FIELD

The present invention relates to a head-up display structured to be incorporated to a dashboard of a car or the like to display an image on a combiner.

BACKGROUND ART

In recent years, in various vehicles such as an automobile, a head-up display (hereinafter, referred to as an "HUD") has been adopted which is structured to reflect images on a combiner front fanned in a concave plate shape to display driving informations that are superimposed on each other in view of a driver.

FIG. 8 through FIG. 10B are views showing a conventional HUD with a combiner which is attached in a dashboard of a car. The combiner HUD is generally structured by incorporating a combiner 21 formed in a concave plate shape and a projection unit 22 for projecting images toward the combiner 21 in an inside of a case main body 20 whose upper face is formed with an opening part.

The combiner 21 is integrally provided with a turnable shaft 23 along its one side and is turnable between a position where the combiner 21 closes the case main body 20 and a position where the combiner 21 is stood up from the upper face of the case main body 20 through the turnable shaft 23.

A helical gear 24 is provided at one end part of the turnable shaft 23 and a worm gear 26 provided in an output shaft of a stepping motor 25 is threadedly engaged with the helical gear 24. Further, a spiral spring 27 for urging the turnable shaft 23 in a direction so that the combiner 21 closes the opening part around an axial line is provided at the other end part of the turnable shaft 23.

Since structured as described above, the combiner HUD makes the combiner 21 stand up by the stepping motor 25 to project an image from the projection unit 22 when the combiner HUD is used and, after that, the combiner 21 is accommodated inside the opening part of the case main body 20 by an urging force of the spiral spring 27. A structure of the HUD which is incorporated inside a dashboard is also disclosed, for example, in Patent Literature 1 described below.

CITATION LIST

Patent Literature

[Patent Literature 1] Japanese Patent Laid-Open No. Hei 11-091403

SUMMARY

Technical Problem

In the conventional HUD structured as described above, when an external force for turning the combiner 21 is forcibly acted by a hand of a person or the like, the structural components such as the helical gear 24 and the worm gear 26 may be broken. Therefore, normally, some breakage prevention mechanism is required to provide for preventing breakage of the structural component by the external force.

As the breakage prevention mechanism, for example, a structure for mounting a frictional resistance or a gear meshing type clutch is used in a drive system from the stepping motor 25 to the turnable shaft 23. However, in the breakage prevention mechanism, relative displacement occurred when the clutch is operated is left as it is and thus, the combiner 21 is required to return to the original position by using a sensor structured to detect a position of the combiner 21. Therefore, the entire device becomes complicated and its cost is increased.

In view of the problem described above, the present invention provides an HUD which is capable of being self-returned to an original position with a simple structure even when an external force is applied to the combiner.

Solution to Problem

In order to solve the above-mentioned problem, the present invention provides a head-up display including a case main body which is formed with an opening part in a top plate, a combiner which is formed in a plate shape and is structured to be capable of closing the opening part, a combiner drive unit including a drive device structured to turn a turnable shaft provided in the combiner to locate the combiner at a position where the combiner closes the opening part and a position where the combiner is stood up from the top plate and a spring configured to urge the turnable shaft in a direction so that the combiner closes the opening part, and a projection unit structured to project an image toward the combiner when the combiner is stood up, and the combiner, the combiner drive unit and the projection unit are accommodated inside the case main body. The combiner drive unit is integrally provided with a second turnable shaft so that a direction of an axial line of the second turnable shaft is parallel with the turnable shaft, and a bearing which turnably supports the second turnable shaft is provided in a base part fixed to the case main body so as to be turnable around the axial line with respect to the base part. In addition, a first spring configured to urge the bearing with respect to the base part in a clockwise direction (or a counterclockwise direction) is provided between the base part and the bearing, and a second spring configured to urge the combiner drive unit with respect to the bearing in the counterclockwise direction (or the clockwise direction) is provided between the bearing and the combiner drive unit.

Further, in the present invention, it is preferable that each of the first spring and the second spring is a torsion spring which is attached around the second turnable shaft and end parts of the torsion spring are extended to outer sides, one end part of the first spring is engaged with the base part and the other end part of the first spring is engaged with the bearing, and one end part of the second spring is engaged with the bearing and the other end part of the second spring is engaged with the combiner drive unit.

Advantageous Effects of Invention

In the above inventions, in a case that, for example, the first spring urges the bearing in a clockwise direction with respect to the base part and the second spring urges the combiner drive unit in a counterclockwise direction with respect to the bearing, when an external force for turning in the counterclockwise direction is applied to the combiner, the bearing and the combiner drive unit are integrally turned in the counterclockwise direction with respect to the base part while an urging force of the first spring is increased, and thereby the external force is absorbed.

On the other hand, when an external force for turning in the clockwise direction is applied to the combiner, the second turnable shaft of the combiner drive unit is turned in the clockwise direction with respect to the bearing while an urging force of the second spring is increased, and thereby the external force is absorbed.

Further, in a case that the first spring urges the bearing in a counterclockwise direction with respect to the base part and the second spring urges the combiner drive unit in a clockwise direction with respect to the bearing, when an external force for turning in the counterclockwise direction is applied to the combiner, the second turnable shaft of the combiner drive unit is turned in the clockwise direction with respect to the bearing while an urging force of the second spring is increased, and thereby the external force is absorbed.

Further, when an external force for turning in the clockwise direction is applied to the combiner, the bearing and the combiner drive unit are integrally turned in the counterclockwise direction with respect to the base part while an urging force of the first spring is increased, and thereby the external force is absorbed.

In both cases, when the external force is released, the combiner is returned to its original position by the increased urging force of the first spring or the second spring. As a result, the combiner is capable of being self-returned to the original position with a simple structure even when an external force is applied to the combiner.

Various types of a spring may be used as the first and the second springs. However, especially like the invention defined in claim 2, a torsion spring is preferably used which is easily attached and is provided with little degradation of an urging force and elasticity with time.

BRIEF DESCRIPTION OF DRAWINGS

FIGS. 6A and 6B are side views showing operation of the breakage prevention mechanism.

FIGS. 7A and 7B are side views showing operation of the breakage prevention mechanism.

DESCRIPTION OF EMBODIMENTS

FIG. 1 through FIG. 7B show an HUD provided with a combiner in accordance with an embodiment of the present invention. The reference sign "1" in the drawing is a case main body in which an opening part is formed in a top plate 1a. The HUD is generally structured so that a plate-shaped combiner 2 structured to close the opening part, a combiner drive unit 3 including a drive device structured to locate the combiner 2 at a position where the combiner 2 closes the opening part and a position where the combiner 2 is stood up from the top plate 1a, a projection unit 4 structured to project an image toward the combiner 2 in a stood-up state, and a breakage prevention mechanism 5 are accommodated in an inside of the case main body 1.

Figure 1:
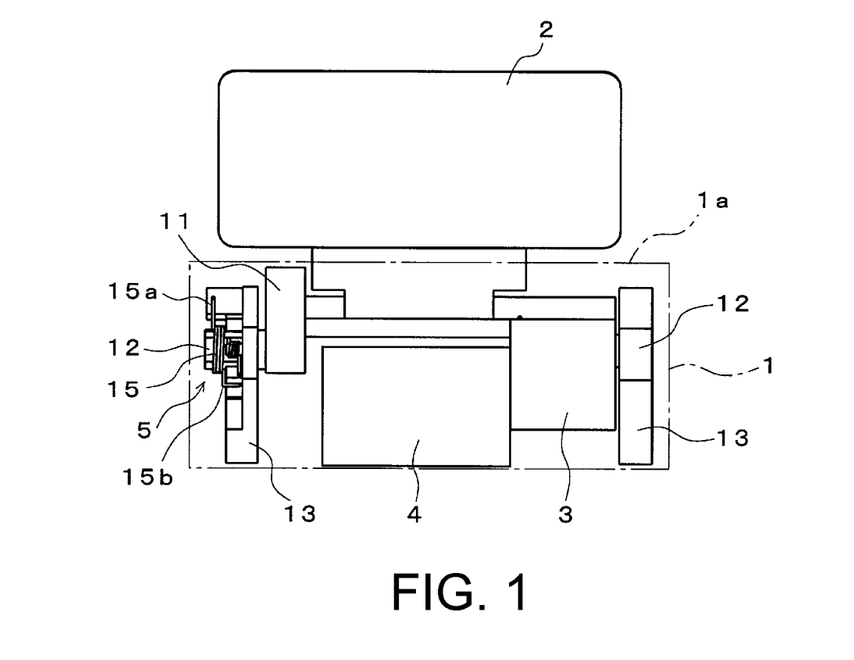
FIG. 1 is a front view showing an HUD in accordance with an embodiment of the present invention.
Figure 2:
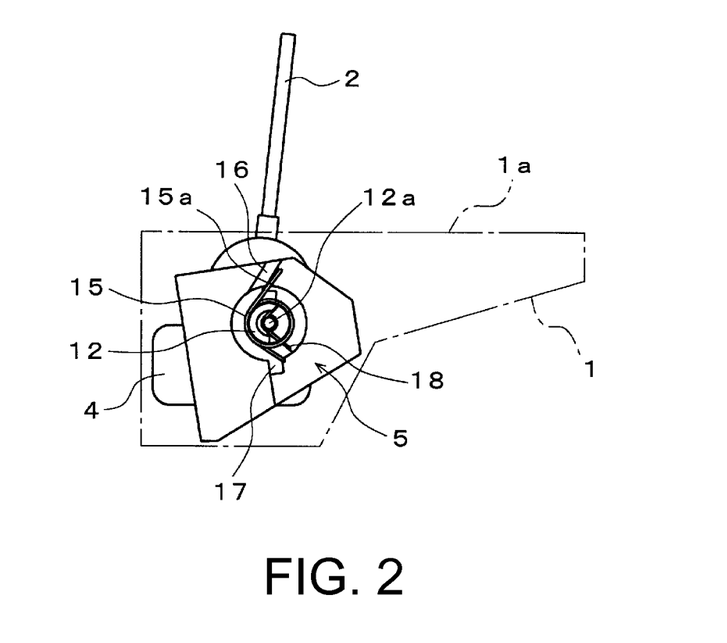
FIG. 2 is a side view showing the HUD in FIG. 1.
Figure 3:
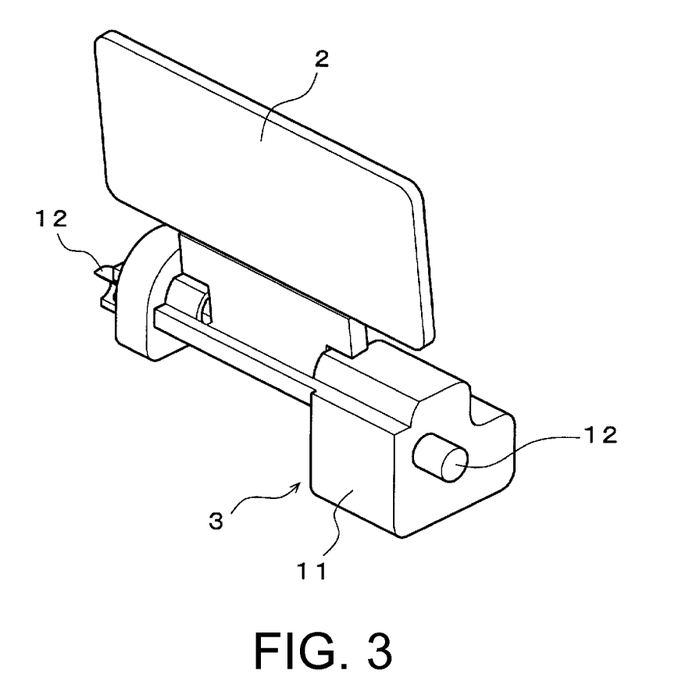
FIG. 3 is a perspective view showing a combiner and a combiner drive unit in FIG. 1.
Figure 4:
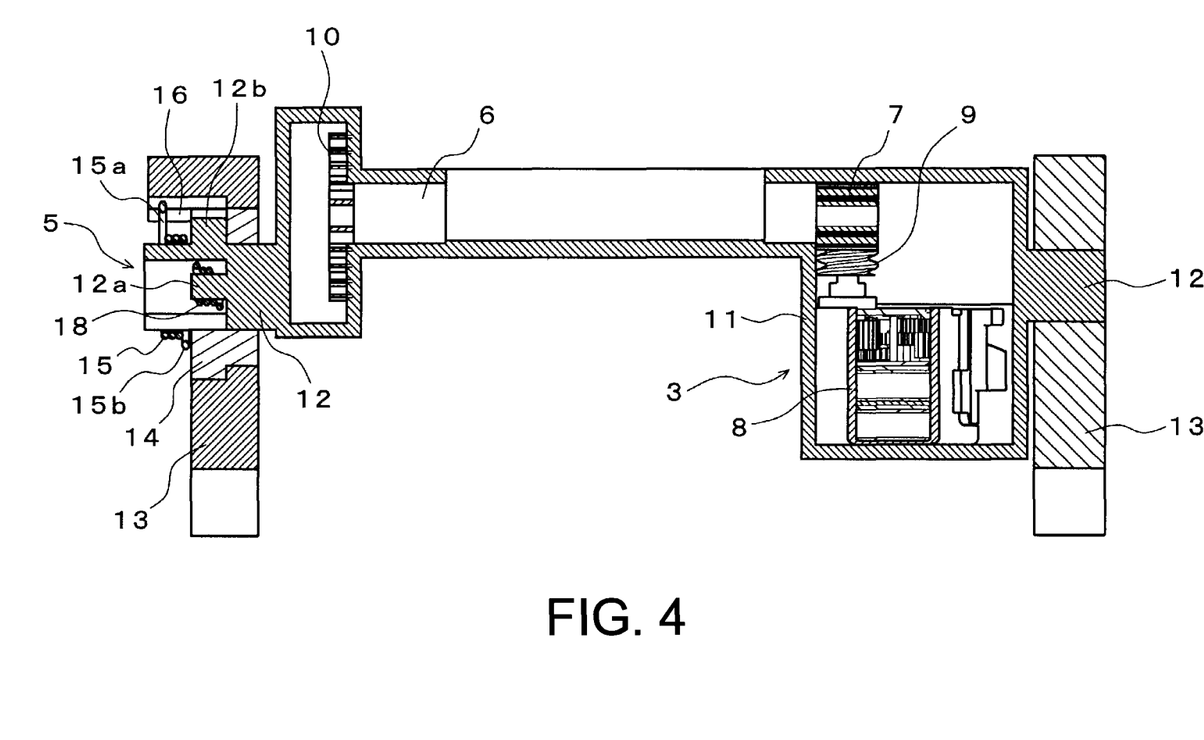
FIG. 4 is a longitudinal sectional view showing a combiner drive unit and a breakage prevention mechanism in FIG. 1.

In this embodiment, the drive device includes, as shown in FIG. 4, a turnable shaft 6 which is integrally provided along one side of the combiner 2, a helical gear 7 provided at one end part of the turnable shaft 6, a worm gear 9 which is provided on an output shaft of a stepping motor 8 and is threadedly engaged with the helical gear 7, and a spiral spring 10 which is provided at the other end part of the turnable shaft 6 to urge the turnable shaft 6 around an axial line in a direction where the combiner 2 closes the opening part.

The drive device is accommodated into an inside of a drive case 11 to structure a combiner drive unit 3.

Side faces of the drive case 11 of the combiner drive unit 3 are integrally foamed with second turnable shafts 12 which are protruded from the side faces so that their axial line directions are parallel to the turnable shaft 6. The combiner drive unit 3 is turnably supported by a pair of base plates (base part) 13 which are stood from a bottom plate of the case main body 1.

Figure 5:
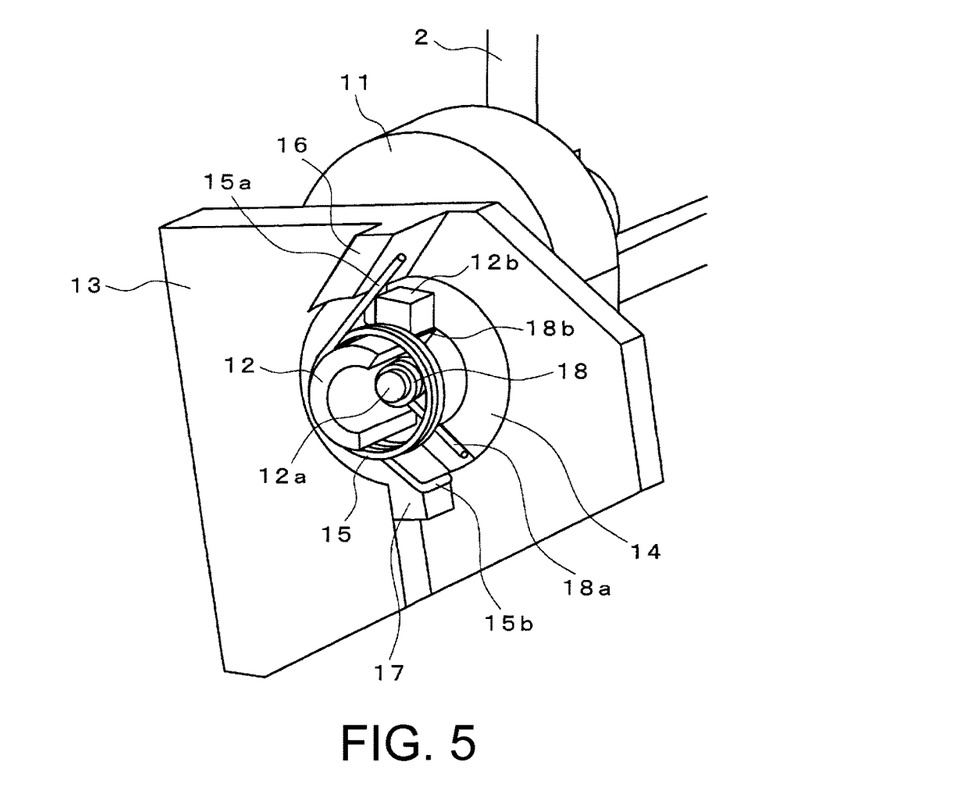
FIG. 5 is a perspective view showing a breakage prevention mechanism in FIG. 2.

The breakage prevention mechanism 5 is provided between one of the second turnable shafts 12 of the combiner drive unit 3 and the base plate 13. In other words, in the breakage prevention mechanism 5, a bearing 14 for turnably supporting the second turnable shaft 12 with respect to the base plate 13 is turnably provided around its axial line with respect to the base part 13.

A portion extended to an outer side from the bearing 14 of the second turnable shaft 12 which is supported by the bearing 14 is formed in a tube shape and a portion about a little less than ½ in a circumferential direction of the tube shaped part is cut out and, in addition, a center part of the second turnable shaft 12 is integrally formed with a shaft part 12a having a small diameter. In addition, an outer peripheral face of the second turnable shaft 12 is integrally formed with an engaging part 12b formed in a protruded shape.

A first spring 15 comprised of a torsion spring is attached around an outer periphery of the second turnable shaft 12. One end part 15a of the first spring 15 is engaged with an engaging part 16 which is protruded from an end face of the base plate 13 and the other end part 15b is bend in an "L"-shape and is fixed to an edge part of the engaging part 17 which is protruded from an end face of the bearing 14. In this manner, the bearing 14 is urged in a clockwise direction with respect to the base plate 13.

A second spring 18 similarly comprised of a torsion spring is attached around an outer periphery of the shaft part 12a having a small diameter which is formed at the center of the second turnable shaft 12. One end part 18a of the second spring 18 is engaged with the bearing 14 and the other end part 18b is fixed to a protruded part 12b protruded on the outer periphery of the second turnable shaft 12. In this manner, the second turnable shaft 12 (combiner drive unit 3) is urged in a counterclockwise direction with respect to the bearing 14.

Figure 6A:
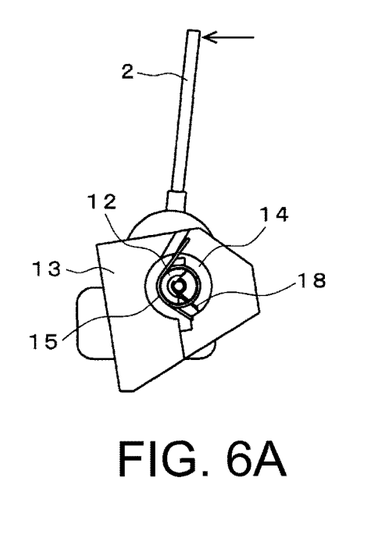
FIG. 6A is a side view showing a state that an external force in a counterclockwise direction is acted on the combiner and FIG. 6B is a side view showing operation in this case.
Figure 6B:
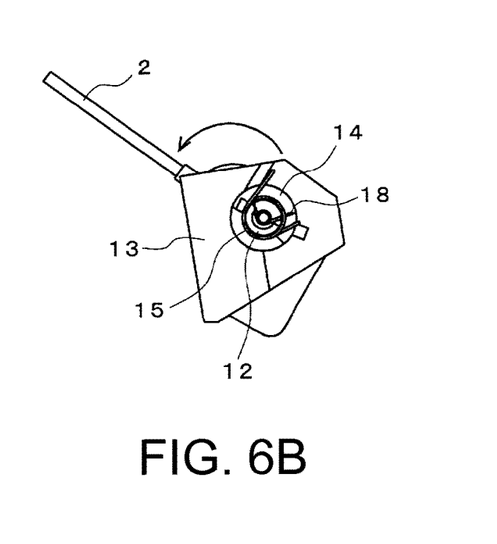

According to the combiner HUD including the breakage prevention mechanism 5 structured as described above, as shown in FIG. 6A, when an external force for turning the combiner 2 in a counterclockwise direction is applied, the bearing 14 and the second turnable shaft 12 of the combiner drive unit 3, i.e., the drive case 11 are, as shown in FIG. 6B, integrally turned with respect to the base plate 13 in a counterclockwise direction while the first spring 15 is resiliently bent, and thereby the external force is absorbed.

Figure 7A:
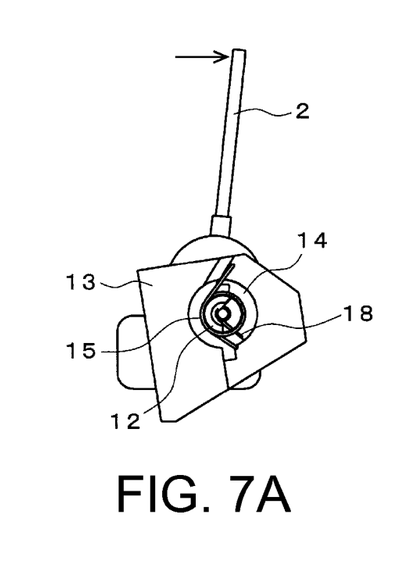
FIG. 7A is a side view showing a state that an external force in a clockwise direction is acted on the combiner and FIG. 7B is a side view showing operation in this case.
Figure 7B:
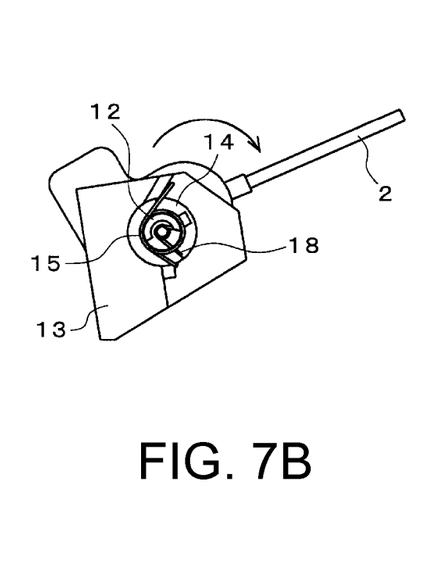
Figure 8:
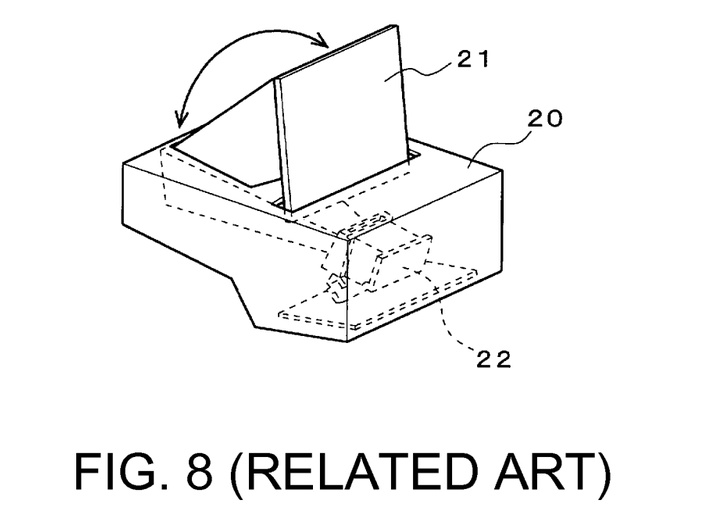
FIG. 8 is a perspective view showing a conventional HUD.
Figure 9:
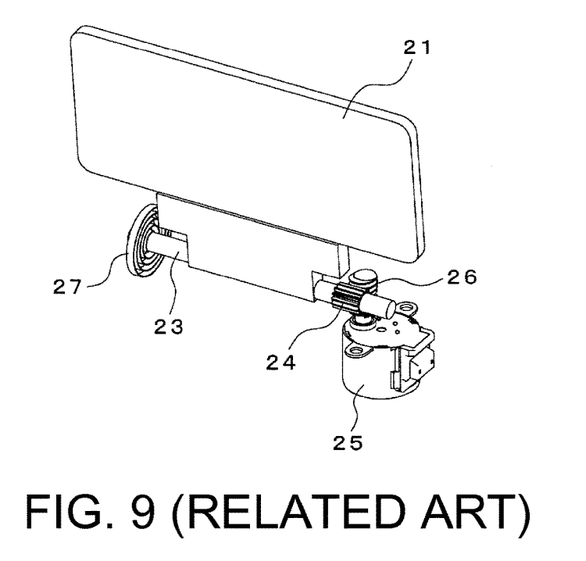
FIG. 9 is a perspective view showing a combiner and a combiner drive unit in FIG. 8.
Figure 10A:
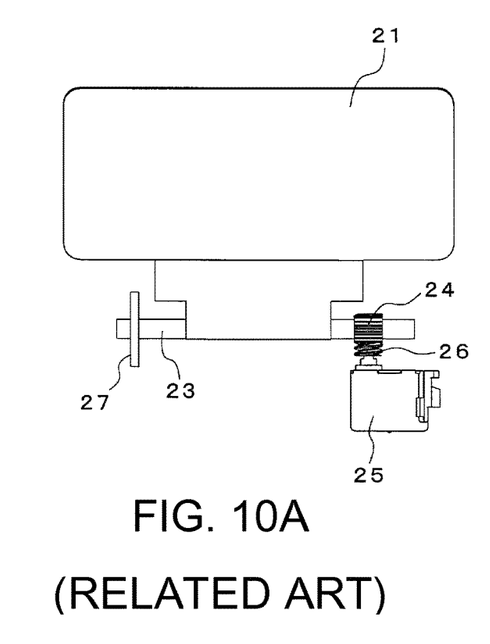
FIG. 10A is a front view in FIG. 9.
Figure 10B:
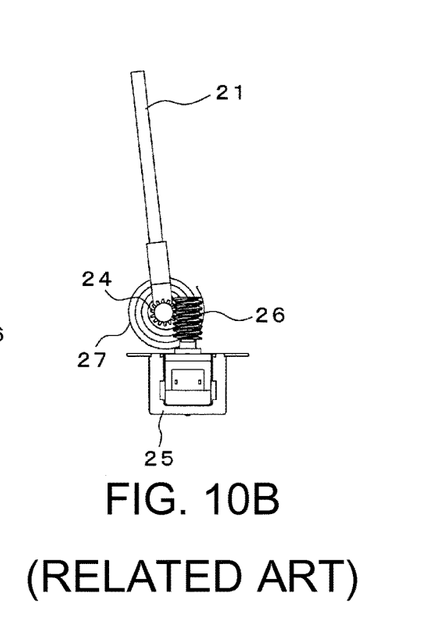
FIG. 10B is a side view in FIG. 9.

On the other hand, when an external force for turning the combiner 2 in a clockwise direction is applied as shown in FIG. 7A, the second turnable shaft 12 is turned in the clockwise direction with respect to the bearing 14 while the second spring 18 is resiliently bent, and thereby the external force is absorbed.

In both of the cases, when the external force is released, the combiner 2 is returned to its original position by the first spring 15 or the second spring 18 whose urging force is increased by being resiliently bent.

In this manner, even in a case that an external force is applied to the combiner 2 from either direction, the external force is absorbed and, when the external force is released, the combiner 2 can be self-returned to the original position with a simple structure.

In the embodiment described above, the bearing 14 is urged in a clockwise direction with respect to the base plate 13 and the second turnable shaft 12 is urged in a counterclockwise direction with respect to the bearing 14 by the first and the second springs 15 and 18. However, the present invention is not limited to the above-mentioned embodiment. Similar operations and effects can be obtained even in a case that the bearing is urged in a counterclockwise direction with respect to the base part by the first spring and the case main body is urged in a clockwise direction with respect to the bearing by the second spring.

What is claimed is:

1. A head-up display comprising:
   a case main body which is formed with an opening part in a top plate;
   a combiner which is fowled in a plate shape and is structured to be capable of closing the opening part;
   a combiner drive unit comprising:
      a drive device structured to turn a first turnable shaft provided in the combiner to locate the combiner at a position where the combiner closes the opening part and a position where the combiner is stood up from the top plate; and
      a spring configured to urge the first turnable shaft in a direction so that the combiner closes the opening part; and
   a projection unit structured to project an image toward the combiner when the combiner is stood up;
   wherein the combiner, the combiner drive unit and the projection unit are accommodated inside the case main body;
   wherein the combiner drive unit is integrally provided with a second turnable shaft so that a direction of an axial line of the second turnable shaft is parallel with the first turnable shaft;
   wherein a bearing which turnably supports the second turnable shaft is provided in a base part fixed to the case main body so as to be turnable around the axial line with respect to the base part;
   wherein a first spring configured to urge the bearing with respect to the base part in a clockwise direction (or a counterclockwise direction) is provided between the base part and the bearing; and
   wherein a second spring configured to urge the combiner drive unit with respect to the bearing in the counterclockwise direction (or the clockwise direction) is provided between the bearing and the combiner drive unit.

2. The head-up display according to claim 1, wherein
   each of the first spring and the second spring is a torsion spring which is attached around the second turnable shaft and end parts of the torsion spring are extended to outer sides,
   one end part of the first spring is engaged with the base part and the other end part of the first spring is engaged with the bearing, and
   one end part of the second spring is engaged with the bearing and the other end part of the second spring is engaged with the combiner driver unit.

* * * * *